UNITED STATES PATENT OFFICE.

GEORGE F. WILSON, OF EAST PROVIDENCE, RHODE ISLAND.

IMPROVED PROCESS OF TREATING OFFAL-GELATINE AND SCRAP FOR THE MANUFACTURE OF FERTILIZERS.

Specification forming part of Letters Patent No. 90,328, dated May 18, 1869.

*To all whom it may concern:*

Be it known that I, GEORGE F. WILSON, of East Providence, in the State of Rhode Island, have invented a new and improved method of treating offal-gelatine and scrap for the purpose of converting the same into fertilizing compounds for agricultural purposes; and I do hereby declare the following to be a full and exact description thereof.

By "offal-gelatine and scrap" I mean the residuary product derived from the boiling or rendering of meats, the carcasses of dead or slaughtered animals, butchers' offal, and bones, for the purpose, among others, of obtaining fat and tallow therefrom. It consists, chiefly, of an aqueous solution of gelatine mixed with flesh, muscle, tendons, viscera, and other parts of the animals from which the fats have been more or less completely extracted, and is particularly rich in those elements which yield ammonia when properly treated, and also, in the course of decomposition, yields sulphide of ammonium and sulphureted hydrogen, and other very offensive products, which have made the business of rendering fats or tallow from the sources described above by the old or common processes extremely hazardous, except in places remote or distant from population and difficult of access, on account of sanitary or other laws designed to prevent the community from real or supposed injurious effects of such business, if carried on in populous neighborhoods. The rendering of the above materials in a state of decomposition in open vessels, or where the vapors are allowed to escape into the air, is often offensive to those living in the neighborhood. If the materials treated are not in a state of decomposition, but are sound and sweet, the above-mentioned residuary products soon enter upon decomposition, and become very noisome and offensive, and soon become comparatively valueless, on account of the loss of ammonia; and so great have been these difficulties that it has hitherto generally been the custom of fat and tallow renderers who use steam for this purpose to cause their offal-gelatine and scrap to be removed from the neighborhood of their rendering-works as soon as possible after its production.

A method has recently been devised and patented by Charles J. Everett, of New York, under date of March 2, 1869, and numbered 87,482, and by said Everett and C. E. Gray of preceding dates, for rendering the above-described materials in closed vessels, and by the passage of the vapors through a coil or coils of iron pipe surrounded by fire, whereby the process of rendering the materials described above, even though they are in a state of decomposition, can be carried on in almost any locality without producing any cause of complaint to those living near by the works. But no process has hitherto been devised, in connection with this apparatus or otherwise, by means of which the above-described residuary products can be inoffensively treated, and their valuable ammoniacal and phosphatic elements fully retained and preserved; and it has been the custom of the parties running even this apparatus to cause the residuary products to be removed to a distant locality as speedily as possible. It has also been the practice to allow the watery or gelatinous portion of the residuary products, which is very valuable on account of the ammonia which it is capable of yielding, to escape by running off into sewers and pond-holes and streams of water.

The nature of my invention consists in the application of proper apparatus and suitable chemical substances or compounds to the treatment of the above-described residuary product, however produced, and in their combination with the above-described rendering apparatus, for the purpose of utilizing, in the manner herein described, the aforesaid residuary products for agricultural fertilizing purposes; and in order that those skilled in the art may be enabled to make and use my invention, I will proceed to describe the same.

It is desirable that the apparatus described in my Patents Nos. 75,325 and 75,327, dated March 10, 1868, should be located near to the apparatus in which the offal-gelatine and scrap are produced; but it is not necessary that this should be done in all cases. It is desirable when practicable, because, by having suitable grades, railways, hoisting-cranes, and distributing apparatus in common use for other purposes, a saving of time, labor, transportation, decomposition, trouble, and offensiveness is sometimes effected thereby.

I put the offal-gelatine and scrap, as soon as possible after its production, into the apparatus described in my patent numbered, as stated above, 75,327, together with a sufficient quantity of acid phosphate of lime, prepared from bone-coal or bone-ash by its decomposition with any of the mineral acids, or the double salts produced by the treatment of these bodies with the salt-cake or niter-cake, as described in my patent numbered, as above stated, 75,325, and mix the materials together, at the same time heating the mass by passing steam through the coil of pipe in the apparatus, thereby drawing off the excess of the water, and effecting the chemical combination and close mechanical union of all the ingredients with comparatively little or no escape of ammonia, or of noisome and offensive vapors or gases. When these ingredients or materials have become sufficiently concentrated and dried, the mass may be removed and mixed with the bone sulphate of lime described in my patent dated August 11, 1863, No. 39,515, or with mineral gypsum, dried peat, marl, or clay, in any desirable quantity to meet the demands of the trade as to price. My object, however, being to produce a concentrated fertilizer, I propose to use only so much of any of these bodies as will overcome the well-known gummy and sticky property of commercial phosphatic fertilizers, which sometimes render their use in an acceptable manner somewhat difficult.

I have tried the mixture of fine bone, coal-dried peat, marl, and clay with the offal-gelatine and scrap without its concentration, but have found the practice objectionable for a variety of reasons, among which are the great dilution of the fertilizing bodies or elements, and consequent defeat of one of the prime objects of the production of a fertilizer, which is its concentration, and the loss of the ammonia from the want of an acid suitable to combine with it, and to produce a non-volatile salt. I have sometimes mixed fine bone coal-dust with the offal-gelatine and scrap, and carried on the concentration as described above, which plan partially prevents the escape of offensive odors, but does not wholly prevent the escape of ammonia. The subsequent treatment of the mass so produced with an acid to decompose the bone-coal and obtain free phosphoric acid and take up ammonia is attended with additional expense, and with the liberation of very noisome and offensive odors, and with the loss of ammonia, and with the carbonization of portions of organic matter by the oil of vitriol or other acid employed for the purpose. No such effect is produced when the acid phosphate made by either of the patented processes described above is employed. The acid phosphate practically retains all the deodorizing properties of the bone-coal, while the free phosphoric acid takes up the ammonia disengaged from the offal-gelatine and scrap, and has no carbonizing or other deleterious effect on the organic matter with which it has to come in contact. The phosphate of ammonia thus produced is undoubtedly the best and most valuable of all known fertilizers.

It will be seen that by the plans which I have devised and described above for the treatment of this hitherto troublesome and offensive offal-gelatine and scrap, it can be treated and converted into a fertilizer at the place where it is possible to produce it, and that, from the first step in the process to the last in its concentration, the value for fertilizing purposes of the offal-gelatine and scrap, and the chemical substances or compounds employed in the processes, is constantly on the increase, on account of their continual concentration by the employment of apparatus suited to the purpose of driving off the water to any required extent. Besides, or in addition to, the acid phosphate of lime described above, I sometimes use a salt of iron prepared with sulphuric, muriatic, or nitric acid, for the purpose of securing its deodorizing and antiseptic effects, and also for the purpose of adding to the value of the fertilizer as a manure—iron being useful to vigorous and healthful plant growth. I usually mix the iron-salt in the compound after I have nearly completed the process of concentration described above. The proportion of the above-described acid phosphate of lime to be used in a given quantity of the offal-gelatine and scrap varies according to the nature of the latter, the object being to take up the ammonia, and deodorize, or measurably so, the product.

In practice I have found the following proportions to be about right for the purpose: For two thousand pounds of offal-gelatine and scrap, as commonly produced, I use five hundred pounds of the acid phosphate and about twenty-five pounds of the iron-salt in solution in water or otherwise, as it may be most convenient. The larger the proportion of solid matter present in the offal-gelatine and scrap, the larger the quantity of acid phosphate to be used.

What I claim as my invention, and desire to secure by Letters Patent, is—

1. The treatment of offal-gelatine and scrap, substantially as herein described, employing in such treatment the apparatus, or its equivalent, described in Letters Patent No. 75,327, and dated March 10, 1868, as above specified.

2. The application of the above-described acid phosphate of lime and of salt of iron, separate or combined, as and for the purposes substantially as described.

3. The employment, in combination with the apparatus, or its equivalent, referred to in the first clause of claims, of the apparatus devised and patented by Chas. J. Everett and C. E. Gray, also referred to in this specification, for the purpose of utilizing thereby the above-described residuary products, which result from the method, described in their aforesaid patents, of rendering tallow and fats from the materials employed for the purpose, as therein specified.

4. The combined use of the apparatus referred to in the first clause of claim, and of the aforesaid acid phosphate of lime and salt of iron, used separately or together, for the purpose of treating the above-described offal-gelatine and scrap, however obtained.

5. The use of the bone sulphate of lime described in my patent of August 11, 1863, and numbered 39,519, with the aforesaid offal-gelatine and scrap, either before or after its concentration, as above described.

6. The use of the aforesaid bone sulphate of lime, of dried peat, of gypsum, of clay, of marl, or their equivalents, with the product resulting from the treatment of offal-gelatine and scrap, substantially as herein described, for the purposes of rendering the same less sticky and gummy, and easier of uniform distribution in the soil.

7. The concentration of the aforesaid offal-gelatine and scrap, whenever the aforesaid acid phosphate of lime and salt of iron are used separately or together, whether the same be effected in my aforesaid patent apparatus or otherwise, for the purposes substantially as above described, and also the use of either of the bodies described in sixth clause of claims, or their equivalent, either before or after the concentration of the aforesaid offal-gelatine and scrap.

8. The fertilizer produced by the treatment of offal-gelatine and scrap, in the manner and for the purpose substantially as herein described.

In testimony whereof, I have signed my name to this specification before two subscribing witnesses.

GEO. F. WILSON.

Witnesses:
 N. D. ARNOLD,
 J. H. FOLLETTE.